(12) United States Patent
Dias et al.

(10) Patent No.: US 11,214,279 B2
(45) Date of Patent: Jan. 4, 2022

(54) CONTROLLING THE OPERATION OF A HEAD-UP DISPLAY APPARATUS

(71) Applicant: Jaguar Land Rover Limited, Coventry (GB)

(72) Inventors: Eduardo Dias, Coventry (GB); Robert Hardy, Coventry (GB)

(73) Assignee: Jaguar Land Rover Limited, Coventry (GB)

( * ) Notice: Subject to any disclaimer, the term of this patent is extended or adjusted under 35 U.S.C. 154(b) by 0 days.

(21) Appl. No.: 16/349,203

(22) PCT Filed: Jan. 30, 2018

(86) PCT No.: PCT/EP2018/052290
§ 371 (c)(1),
(2) Date: May 10, 2019

(87) PCT Pub. No.: WO2018/145954
PCT Pub. Date: Aug. 16, 2018

(65) Prior Publication Data
US 2019/0283778 A1 Sep. 19, 2019

(30) Foreign Application Priority Data

Feb. 13, 2017 (GB) ..................................... 1702307

(51) Int. Cl.
*B60W 50/14* (2020.01)
*G02B 27/01* (2006.01)
(Continued)

(52) U.S. Cl.
CPC ......... *B60W 50/14* (2013.01); *G02B 27/0179* (2013.01); *G06F 3/012* (2013.01);
(Continued)

(58) Field of Classification Search
CPC combination set(s) only.
See application file for complete search history.

(56) References Cited

U.S. PATENT DOCUMENTS 3,903,362 A * 9/1975 Wern ....................... H04N 3/30
375/240.21
10,271,265 B2 * 4/2019 Breaux, III ......... H04W 84/005
(Continued)

FOREIGN PATENT DOCUMENTS

DE 198 13 300 A1 10/1999
EP 1 605 233 A1 12/2005
(Continued)

OTHER PUBLICATIONS

Patents Act 1977: Combined Search and Examination Report under Sections 17 and 18(3), UKIPO Application No. GB1702307.8, Aug. 15, 2017, 7 pp.

(Continued)

*Primary Examiner* — Christopher E Leiby
(74) *Attorney, Agent, or Firm* — McCoy Russell LLP

(57) ABSTRACT

A method (900, 1000, 1200, 1300) of controlling the operation of a head-up display apparatus (302), a control apparatus (801), a system (302), a vehicle (101), a computer program (804) and a non-transitory computer readable medium (806) is disclosed. The method (900, 1000, 1200, 1300) comprises: obtaining first directional data indicative of a path of a vehicle (101, 101A, 101B); and adjusting the position of a graphical element (106) presented by the head-up display apparatus (302) in dependence on the first directional data.

17 Claims, 12 Drawing Sheets

(51) Int. Cl.
*G06K 9/00* (2006.01)
*G06F 3/01* (2006.01)

(52) U.S. Cl.
CPC ......... *G06F 3/013* (2013.01); *G06K 9/00845* (2013.01); *B60W 2050/146* (2013.01); *G02B 2027/0181* (2013.01); *G02B 2027/0183* (2013.01)

(56) References Cited

U.S. PATENT DOCUMENTS

| | | | | |
|---|---|---|---|---|
| 10,592,916 | B1* | 3/2020 | DeLorean | G08G 1/095 |
| 2005/0259979 | A1* | 11/2005 | Huebner | G11B 19/02 |
| | | | | 386/267 |
| 2008/0291032 | A1* | 11/2008 | Prokhorov | B60W 50/14 |
| | | | | 340/576 |
| 2014/0162219 | A1* | 6/2014 | Stankoulov | G09B 29/003 |
| | | | | 434/65 |
| 2014/0362195 | A1 | 12/2014 | Ng-Thow-Hing et al. | |
| 2016/0062115 | A1* | 3/2016 | Girschick | G02B 27/01 |
| | | | | 359/631 |
| 2017/0038595 | A1* | 2/2017 | Kutomi | G02B 27/01 |
| 2019/0213429 | A1* | 7/2019 | Sicconi | G06F 3/016 |

FOREIGN PATENT DOCUMENTS

| | | |
|---|---|---|
| EP | 3 159 782 A1 | 4/2017 |
| JP | 2013-29855 A | 2/2013 |
| KR | 10-2015-0054023 A | 5/2015 |
| WO | WO 2013/136374 A1 | 9/2013 |

OTHER PUBLICATIONS

International Search Report and Written Opinion of the International Searching Authority, International Application No. PCT/EP2018/052290, dated May 4, 2018, 15 pp.

* cited by examiner

CONTROLLING THE OPERATION OF A HEAD-UP DISPLAY APPARATUS

RELATED APPLICATIONS

This application is a 35 U.S.C. § 371 national stage application of PCT Application No. PCT/EP2018/052290, filed on Jan. 30, 2018, which claims priority from Great Britain Patent Application No. 1702307.8, filed on Feb. 13, 2017, the contents of which are incorporated herein by reference in their entireties. The above-referenced PCT International Application was published in the English language as International Publication No. WO 2018/145954 A1 on Aug. 16, 2018.

TECHNICAL FIELD

The present disclosure relates to controlling the operation of a head-up display apparatus. In particular, but not exclusively it relates to controlling the operation of a head-up display apparatus in a vehicle, such as a car.

Aspects of the invention relate to a method, a control apparatus, a system, a vehicle, a computer program or a non-transitory computer readable medium.

BACKGROUND

Head-up display systems for cars are known in which a graphical element is presented to a driver to appear above or in front of the bonnet or hood on the driver's side to provide information to the driver. This presents the information to the driver with less redirection of their eyes than might otherwise be required using traditional instruments in an instrument panel. A problem with existing systems is that when the vehicle travels around a bend, the driver is required to redirect their viewing direction from the path of the vehicle to see the information presented by the head up display and therefore their attention is taken away from the road ahead.

It is an aim of the present invention to address disadvantages of the prior art.

SUMMARY OF THE INVENTION

Aspects and embodiments of the invention provide a method, an apparatus, a system, a vehicle, a computer program and a non-transitory computer readable medium as claimed in the appended claims.

According to an aspect of the invention there is provided a method of controlling the operation of a head-up display apparatus comprising: obtaining first directional data indicative of a path of a vehicle; presenting a graphical element formed from generated image data; and adjusting the position of the presented graphical element in dependence on the first directional data.

The path may be prescribed by a road lane in which the vehicle is travelling, the determination of which may be made by vehicle mounted cameras, radar and/or lidar type sensors, additionally or alternatively, the path may be an estimation of the intended vehicle trajectory based at least in part on a detected steering input (both steering angle and angular rate), the speed of the vehicle, the direction of travel, navigation data including stored route data, time, detection of objects and surfaces surrounding the vehicle, and/or any other indicator. This provides the advantage that the position of the presented graphical element may be kept close to a direction in which the driver of the vehicle is likely to be looking.

In some embodiments the method comprises presenting the graphical element to a user of the vehicle, as an image on a windshield (or windscreen) of the vehicle, as an image on a transparent or translucent member positioned between a user of the vehicle and the windshield, or as a virtual object on the outside of the windshield.

This provides the advantage that the direction of the presented graphical element may be close to a direction through the windshield in which the driver of the vehicle is likely to be looking.

In some embodiments the method comprises adjusting the position of the graphical element in a direction along a lateral axis of the vehicle in dependence on the first directional data.

This provides the advantage that the position of the presented graphical element is kept within a defined region. Therefore, it may be prevented from interfering with the view of the driver through the windshield.

In some embodiments the method comprises: obtaining second directional data representative of an orientation of a head of a user and/or an eye-gaze direction of the user; and adjusting the position of the graphical element in dependence on the second directional data.

This provides the advantage that the direction of the graphical element from a driver's eyes may be more closely aligned to a direction in which the driver of the vehicle is likely to be looking.

In some embodiments the method comprises: receiving an image representative of the head of the user from an image sensing means; and analysing the image to generate the second directional data in dependence on the image.

In some embodiments the adjusting comprises adjusting the position of the graphical element in dependence on the first directional data only, in dependence on the second directional data being temporarily unavailable.

This provides the advantage that the method is able to be performed even when the orientation of the users head or eye-gaze direction cannot be determined.

In some embodiments the adjusting comprises adjusting the position of the graphical element in dependence on both the first directional data and the second directional data.

In some embodiments the adjusting comprises adjusting the position of the graphical element to a position that depends on both the first directional data and the second directional data.

This provides the advantage that the position of the graphical element may be maintained at a position dependent on a steering angle and/or angular rate but may be located closer to a position at which the driver is looking.

In some embodiments the adjusting comprises adjusting the position of the graphical element in a direction along the lateral axis of the vehicle in dependence on the second directional data.

In some embodiments the adjusting comprises adjusting the position of the graphical element in a direction along the lateral axis of the vehicle in dependence on the second directional data.

This provides the advantage that the position of the graphical element is kept within a defined region. Therefore, it may be prevented from interfering with the view of the driver through the windshield.

In some embodiments the first directional data is received from a sensing device configured to detect a rotational angle of a steering wheel or a steerable element of the vehicle. In an example, the steering angle is indicative of a steering direction of the vehicle, and the adjusting comprises adjusting the position of the graphical element along the lateral axis in the steering direction.

In some embodiments the rate of change of steering angle is indicative of an imminent change of direction of the vehicle, and the adjusting the position of the graphical element comprises adjusting the position of the graphical element along the lateral axis in dependence on said rate of change of steering angle.

Advantageously, using the rate of change of steering input provides a useful indicator as to the intention of the driver to change the direction of the vehicle and their workload. If the rate of change of steering angle is low then the position of the graphical element may track the steering angle and the presentation of the graphical element may operate in a dynamic mode, maintaining the position of the graphical element close to the direction of the driver's gaze. However, if the steering angle changes suddenly, with a relatively high angular rate, the presentation of the graphical element may switch over to a static mode and maintain the position of the presented graphical element regardless of steering input, until the rate of change of steering input falls below a predetermined threshold. This may enhance the legibility of the graphical element for the driver and mitigate against unintentional repositioning of the graphical element to a location that may need to be changed quickly based on steering input. Additionally or alternatively, the presentation of the graphical element may remain in a dynamic mode, but the rate of change of position adjustment may vary in dependence on the rate of change of steering input.

In some embodiments the method comprises increasing a displacement of the graphical element in proportion to the steering angle.

In some embodiments the method comprises varying a displacement of the graphical element in proportion to the rate of change of steering angle.

In some embodiments the method comprises: increasing a displacement of the graphical element in proportion to the steering angle in dependence on the steering angle being less than a threshold value; and maintaining the graphical element at an end position in dependence on the steering angle being equal to or greater than the threshold value.

In some embodiments the method comprises: increasing a displacement of the graphical element in proportion to the rate of change of the steering angle in dependence on the steering angle rate being less than a threshold value; and maintaining the graphical element at an end position in dependence on the rate of change of steering angle being equal to or greater than the threshold value.

This provides the advantage that the graphical element may be moved to a position at a limit of the head-up display corresponding to a steering angle and/or rate of change of steering angle and maintained at that position for larger steering angles or angular rates.

In accordance with another aspect of the present invention there is provided a control apparatus for controlling the operation of a head-up display apparatus, the control apparatus comprising a control means configured to: obtain first directional data indicative of a path of a vehicle; and adjust a position of a graphical element presented by the head-up display apparatus in dependence on the first directional data.

This provides the advantage that the position of the presented graphical element may be kept close to a direction in which the driver of the vehicle is likely to be looking.

In some embodiments the control apparatus is located within a vehicle comprising a windshield and a head-up display apparatus arranged to present the graphical element to a driver of the vehicle, as an image on the windshield, as an image on a transparent or translucent member positioned between a user of the vehicle and the windshield, or as a virtual object on the outside of the windshield.

This provides the advantage that the position of the presented graphical element may be close to a direction through the windshield in which the driver of the vehicle is likely to be looking.

In some embodiments the control means is configured to adjust the position of the graphical element in a direction along a lateral axis of the vehicle in dependence on the first directional data.

This provides the advantage that the position of the graphical element is kept within a defined region. Therefore, it may be prevented from interfering with the view of the driver through the windshield.

In some embodiments the control means is configured to: obtain second directional data representative of an orientation of a head of a user and/or an eye-gaze direction of the user; and adjust the position of the graphical element in dependence on the second directional data.

This provides the advantage that the position of the graphical element may be more closely aligned to a direction in which the driver of the vehicle is likely to be looking.

In some embodiments the control apparatus comprises: input means arranged to receive an image representative of the head of the user from an image sensing means; and processing means configured to analyse the image and generate the second directional data in dependence thereon.

In some embodiments the control means is configured to adjust the position of the graphical element in dependence on the first directional data only, in dependence on the second directional data being temporarily unavailable.

This provides the advantage that the control means is configured to adjust the position of the graphical element even when the orientation of the users head or eye-gaze direction cannot be determined.

In some embodiments the control means is configured to adjust the position of the graphical element to a position that depends on the first directional data and the second directional data.

This provides the advantage that the position of the graphical element may be maintained at a position dependent on both the steering angle and the direction of gaze of the driver, the combination of which are reliable indicators as to the intended vehicle path and so the presented graphical element may be located closer to a position at which the driver is looking.

In some embodiments the control apparatus is configured to adjust the position of the graphical element in a direction along the lateral axis of the vehicle in dependence on the second directional data.

This provides the advantage that the position of the graphical element is kept within a defined region. Therefore, it may be prevented from interfering with the view of the driver through the windshield.

In some embodiments, the control means is configured to receive the first directional data from a sensing device configured to detect a rotational steering angle of a steering wheel or a steerable element of the vehicle. In some embodiments the steering angle is indicative of a steering direction of the vehicle, and the control means is configured to adjust the position of the graphical element along the lateral axis in the steering direction.

In some embodiments the control means is configured increase a displacement of the graphical element in proportion to the steering angle.

In some embodiments the control means is configured vary a displacement of the graphical element in proportion to the rate of change of the steering angle.

In some embodiments the control means is configured to: increase a displacement of the graphical element in proportion to the steering angle in dependence on the steering angle being less than a threshold value; and maintain the graphical element at an end position in dependence on the steering angle being equal to or greater than the threshold value.

In some embodiments the control means is configured to: increase a displacement of the graphical element in proportion to the steering angle in dependence on the rate of change of the steering angle being less than a threshold value; and maintain the graphical element at an end position in dependence on the rate of change of steering angle being equal to or greater than the threshold value.

This provides the advantage that the graphical element may be moved to a position at a limit of the head-up display corresponding to a specific steering angle or angular rate and maintained at that position for steering angles/rates greater than that specific steering angle or angular rate.

In some embodiments the control means comprises at least one electronic processor and at least one electronic memory device coupled to the electronic processor and having instructions stored therein.

In accordance with a further aspect of the present invention there is provided a system comprising the control apparatus of any one of the previous paragraphs and a sensing device configured to generate the first directional data indicative of a steering angle of a vehicle.

In some embodiments the system comprises an image sensing means for capturing an image representative of a head of a user and the control means is configured to analyse the image and generate the second directional data in dependence thereon.

In some embodiments the system comprises a head up display configured to display the graphical element.

For the purposes of this specification, a "head up display" is an apparatus capable of displaying graphical information so that it appears to a user to be superimposed over their view of an exterior environment.

In some embodiments the head up display comprises at least one of: a projection display device arranged to direct light onto a windshield (or windscreen); a projection display device and one or more mirrors for directing light from the display device onto a windshield; an image display device comprising a transparent or translucent member positioned on, or adjacent to, a windshield; and a holographic projector. The projection display device may comprise a DLP (digital light processing) display device, a MEMS (microelectromechanical systems) scanning laser, an LED display, an OLED display, or other light emitting display for generating light that may be reflected off a windshield of the vehicle to create a virtual image outside the windshield In accordance with a still further aspect of the present invention there is provided a vehicle comprising the control apparatus of any one of the previous paragraphs and/or the system of any one of the previous paragraphs.

In accordance with yet another aspect of the present invention there is provided a computer program which when executed by a processor causes the processor to perform the method of any one of the previous paragraphs.

In accordance with yet another aspect of the present invention there is provided a non-transitory computer-readable storage medium having instructions stored therein which when executed on a processor cause the processor to perform the method of any one of claims to the previous paragraphs.

In accordance with another aspect of the present invention there is provided a control apparatus for controlling the operation of a head-up display apparatus the control apparatus comprising an electronic processor having an electrical input for receiving one or more signals each indicative of a path of a vehicle; and an electronic memory device electrically coupled to the electronic processor and having instructions stored therein, wherein the processor is configured to access the memory device and execute the instructions stored therein such that it becomes configured to: obtain first directional data indicative of a path of a vehicle; and adjust a position of a graphical element presented by the head-up display apparatus in dependence on the first directional data.

In accordance with yet another aspect of the present invention there is provided a control apparatus for controlling the operation of a head-up display apparatus the control apparatus comprising an electronic processor having an electrical input for receiving one or more signals each indicative of a value of a steering angle of a vehicle; and an electronic memory device electrically coupled to the electronic processor and having instructions stored therein, wherein the processor is configured to access the memory device and execute the instructions stored therein such that it becomes configured to: obtain first directional data indicative of a steering angle of a vehicle; and adjust a position of a graphical element presented by the head-up display apparatus in dependence on the first directional data.

In accordance with yet another aspect of the present invention there is provided a control apparatus for controlling the operation of a head-up display apparatus, the control apparatus comprising a control means configured to repeatedly: obtain first directional data indicative of a current angle of a steering wheel of a vehicle; and adjust the position of a graphical element presented by the head-up display in dependence on the first directional data.

The control apparatus may be for controlling the operation of a head-up display in a vehicle. The vehicle may comprise a land-going vehicle such as a car, or an aircraft or watercraft, for example.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
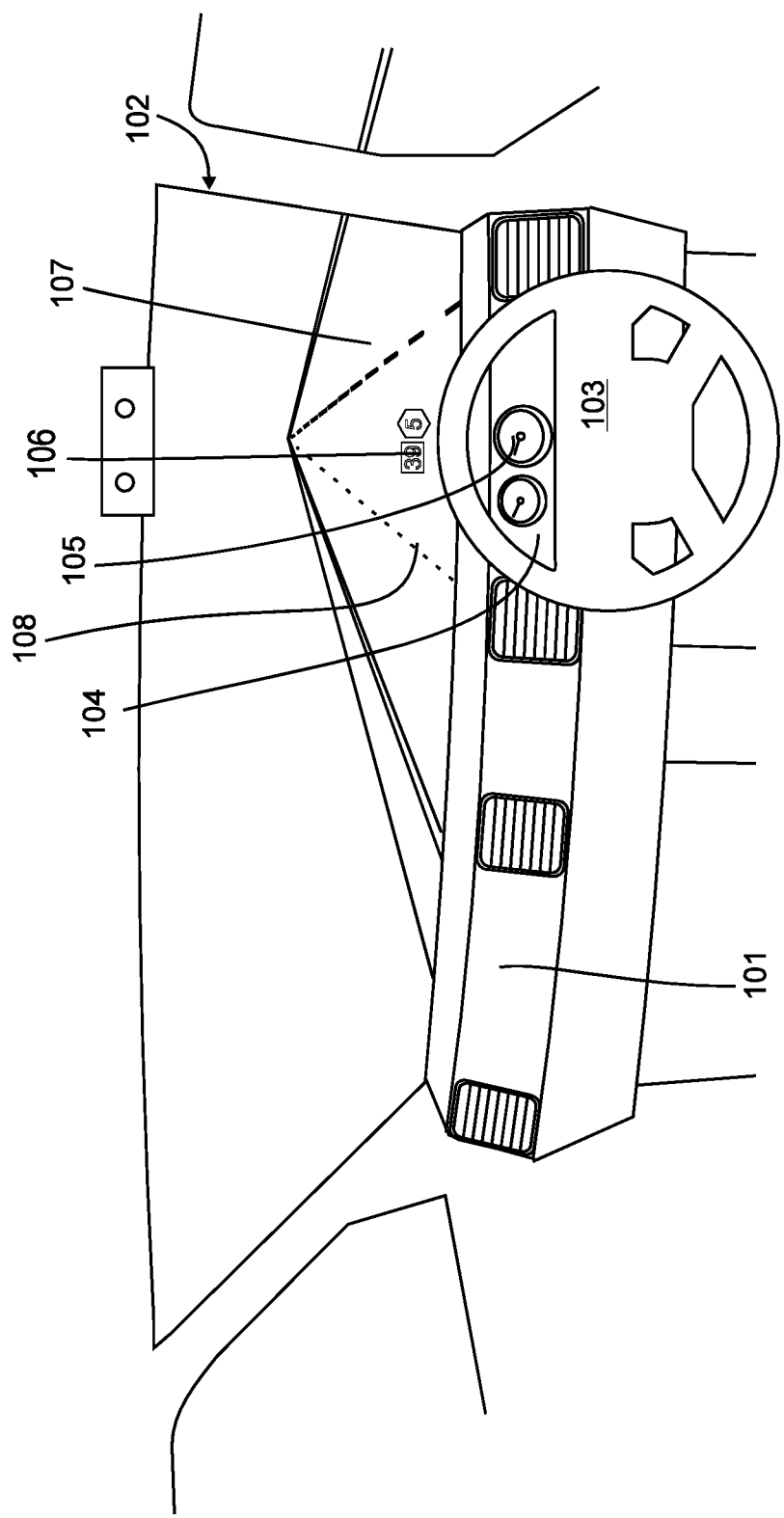
FIG. 1 shows a view from a driver's seat of a vehicle illustrating the operational use of an embodiment of the invention.

The Figures illustrate a control apparatus 801 for controlling the operation of a head-up display apparatus 302 for a vehicle, and a method 900, 1000, 1200, 1300 of controlling the operation of a head-up display apparatus 302, comprising: obtaining first directional data indicative of a path of the vehicle 101, 101A, 101B; and adjusting the position of a graphical element 106 presented by the head-up display apparatus 302 in dependence on the first directional data.

A view from a driver's seat (320, shown in FIG. 3) of a vehicle 101 is shown in FIG. 1. A windshield 102 of the vehicle 101 is positioned in front of the driver's seat and behind a steering wheel 103 as viewed by a driver. The vehicle 101 includes a dashboard 104 including a speedometer 105 for displaying the current speed of the vehicle 101 to the driver. The vehicle 101 also comprises a head-up display system (301, shown in FIG. 3) that displays a graphical element 106 showing the speed of the vehicle. In the illustrated embodiment, the graphical element 106 also displays the currently selected gear (which is fifth gear in the illustrated embodiment).

The graphical element 106 may be displayed as a virtual object to the driver, so that it appears to be positioned on the outside of the windshield 102, or alternatively it may be displayed as a real image on, or adjacent to, the windshield 102, as will be described below.

The vehicle 101 is shown on a straight road 107 in FIG. 1, and travelling forwards along a straight line (shown as a dashed line 108) along the road. The steering wheel 103 is in a neutral position, in that it is not substantially turned either anticlockwise or clockwise, to maintain the steerable road-wheels (310, shown in FIG. 3) at a suitable position to maintain the straight forwards direction of the vehicle 101 along the road 107.

For the purposes of the present specification, when a vehicle 101 is travelling along a straight line in this way, it is said to have a steering angle of 0 degrees. For the purposes of this description, if the steering wheel 103 is turned to cause the vehicle 101 to turn towards the passenger's side of the vehicle (i.e. to the left for a right-hand-drive vehicle or to the right for a left-hand-drive vehicle) the vehicle 101 is said to have a positive steering angle, conversely, if the steering wheel 103 is turned to cause the vehicle 101 to turn towards the driver's side of the vehicle (i.e. to the right for a right-hand-drive vehicle or to the left for a left-hand-drive vehicle), it is said to have a negative steering angle.

With a steering angle of 0 degrees, as shown in FIG. 1, the graphical element 106 is displayed behind the steering wheel 103, as viewed by a driver, and consequently the driver does not have to divert his/her eyes from the road 107 ahead in order to view the graphical element 106.

Figure 2:
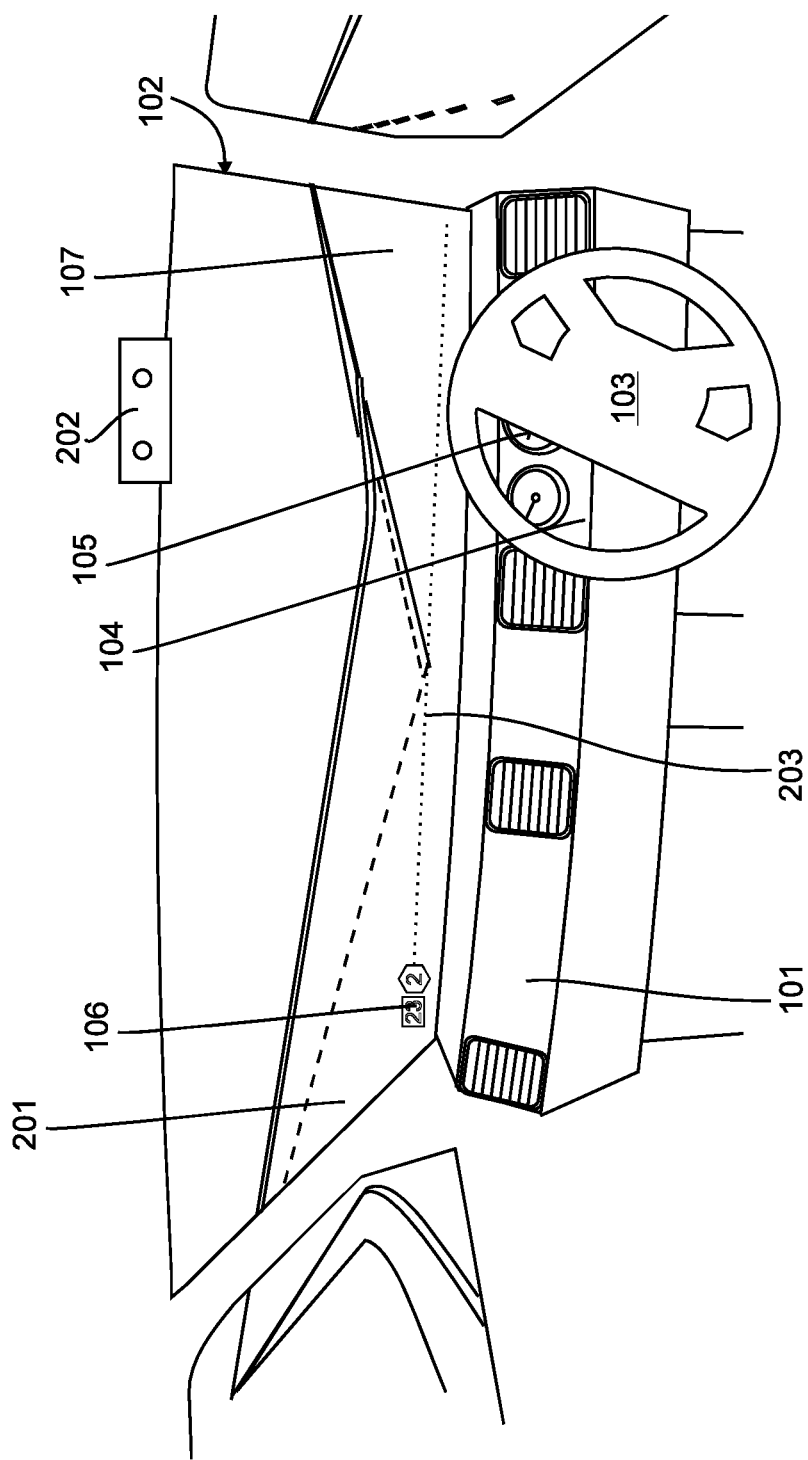
FIG. 2 shows a view from a driver's seat of a vehicle illustrating the operational use of an embodiment of the invention.

A similar view from a driver's seat of the vehicle 101 to that shown in FIG. 1 is shown in FIG. 2, and the features of the vehicle 101 have been labelled with the same reference symbols. FIG. 2 differs from FIG. 1 in that the vehicle 101 is turning left off the road 107 onto a side road 201. The vehicle 101 therefore has a positive steering angle in FIG. 2, as illustrated by the steering wheel 103 being turned anti-clockwise from its neutral position. Advantageously, the head-up display system (301, shown in FIG. 3) is arranged to adjust the position at which the graphical element 106 is displayed in dependence on the steering angle of the vehicle 101. In the embodiment shown in FIG. 2, the steering angle is relatively large, because the vehicle 101 is being turned sharply to the left around a bend. In dependence on the steering angle, the graphical element 106 has been displaced from its position shown in FIG. 1 to a position near to the left edge of the windshield 102. As a consequence, the graphical element 106 is displayed at a position at, or near to, where a driver is likely to be looking while driving around the bend onto the side road 201, and so the driver still does not have to divert his/her eyes from the road 201 ahead to view the graphical element 106.

In the present embodiment, the head-up display system (301, shown in FIG. 3) is arranged to adjust the position at which the graphical element 106 is displayed along a lateral axis (shown by dotted line 203) which extends approximately parallel to the width of the windshield and a distance (of one or more metres) in front of the windshield. In alternative embodiments, the position at which the graphical element 106 is displayed is adjusted along a lateral axis 203 along or adjacent to the windshield.

Furthermore, it may be noted that the head-up display system (301, shown in FIG. 3) is arranged to adjust the position of the graphical element 106 along the lateral axis 203 in the steering direction of the vehicle. That is, when the steering wheel 103 is rotated anticlockwise to produce a leftward steering direction of the vehicle 101 the position of the graphical element 106 is moved leftward along the lateral axis 203 by a distance that depends on the angle through which the steering wheel 103 is turned.

In the present embodiment, the position of the graphical element 106 is adjusted for positive steering angles, but is maintained at a position behind the steering wheel 103, as viewed by a driver, as shown in FIG. 1, for negative steering angles. However, in alternative embodiments the position of the graphical element 106 is adjusted for both positive steering angles and negative steering angles in the steering direction. Therefore, in these embodiments, when the steering wheel 103 is rotated clockwise to produce a rightward steering direction of the vehicle 101 (in a right hand drive vehicle) the position of the graphical element 106 is moved rightward along the lateral axis 203 by a distance that depends on the angle through which the steering wheel 103 is turned.

In the illustrated embodiment, the displacement of the graphical element 106 from its first position corresponding to the neutral position of the steering wheel 103 is proportional to the steering angle of the vehicle 101 up to a steering angle equal to a threshold value. For steering angles that are greater than the threshold value the position of the graphical element 106 is maintained. Thus for example, as the steering wheel 103 is turned anticlockwise the graphical element 106 is moved leftwards by a proportional distance until it reaches the position shown in FIG. 2, next to the left edge of the windshield 102. When the graphical element 106 has reached this position, further rotation of the steering wheel 103 anticlockwise has no effect on the position of the graphical element 106.

In some embodiments, the head-up display system may be arranged to position the graphical element 106 at least in part in dependence on the rate of change of steering angle. The rate of change of steering angle may be used as indicative of an imminent change of direction of the vehicle 101, and the adjustment of the position of the graphical element 106 comprises adjusting the position of the graphical element 106 along the lateral axis in dependence on the rate of change of steering angle. Using the rate of change of steering input provides a useful indicator as to the intention of the driver to change the direction of the vehicle 101 and may also be used as indicative of their workload. If the rate of change of steering angle is low then the position of the graphical element 106 may track the steering angle, thus the presentation of the graphical element may operate in a dynamic mode, maintaining the position of the graphical element close to the direction of the driver's gaze. However, if the steering angle changes suddenly, with a relatively high angular rate, the presentation of the graphical element may switch over to a static mode and maintain the position of the presented graphical element regardless of steering input, until the rate of change of steering input falls below a predetermined threshold. This may enhance the legibility of the graphical element for the driver and mitigate against unintentional repositioning of the graphical element to a location that may need to be changed quickly based on steering input. Additionally or alternatively, the presentation of the graphical element may remain in a dynamic mode, but the rate of change of position adjustment may vary in dependence on the rate of change of steering input.

As will be appreciated, when driving a vehicle along a relatively straight road, the presentation of the graphical element 106 should remain substantially static. In an embodiment, the head up display may include a damping function, arranged to ignore small inputs in steering angle where constant readjustment of the position of the graphical element may become a source of irritation when driving on a substantially straight road.

However, when driving on a winding road, where the path of the vehicle is subject to frequent changes in direction, the driver will typically follow the road with their eyes ahead of making a change in steering input via a steering wheel. Depending on the nature of the road and the frequency and severity of the bends in the road, the approach to adjustment of the position of the data presented by the head up display may be responsive to the type of road on which the vehicle is travelling. In an embodiment, in order to maintain good correlation between the position of the presented graphical element 106 and the direction of gaze of the user, the control of the head up display may switch between a reactive mode and a predictive mode of operation.

When the steering angle and/or rate of change of the steering angle is below a threshold the display will operate in the reactive mode, where the position of the graphical element is either maintained ahead of the driver, in a static display mode, or adjusted continuously in dependence on input data such as steering angle. When the steering angle and/or rate of change of the steering angle is above a threshold, the display may switch to the predictive mode. In the predictive mode the position of the graphical element is adjusted based on the rate of change of steering angle exceeding a threshold and/or a detected direction of the driver's gaze is confirmed as leading the detected steering angle. In this predictive mode of operation, the graphical element 106 may be repositioned less frequently, jumping to repositioned locations rather than sweeping across the windshield or windscreen and moving to predicted points along the vehicle path corresponding to points where the driver's gaze will rest. Where navigation data is available and/or data from forward looking radar, cameras or the like can provide control means with a location of the apex of an approaching bend, the display may, whilst operating in the predictive mode, position the graphical element 106 near that apex before the driver looks in that direction as that is a direction where their gaze will rest for a period of time before the vehicle passes around the bend.

In some embodiments, the head-up display system may be arranged to position the graphical element 106 in dependence on the steering angle of the vehicle 101 only. However, as will be described below, the head-up display system in some embodiments, also displays the graphical element 106 at a position selected in dependence on data obtained from images provided by an image sensing means 202, such as one or more driver facing cameras 202 mounted within the vehicle 101.

Figure 3:
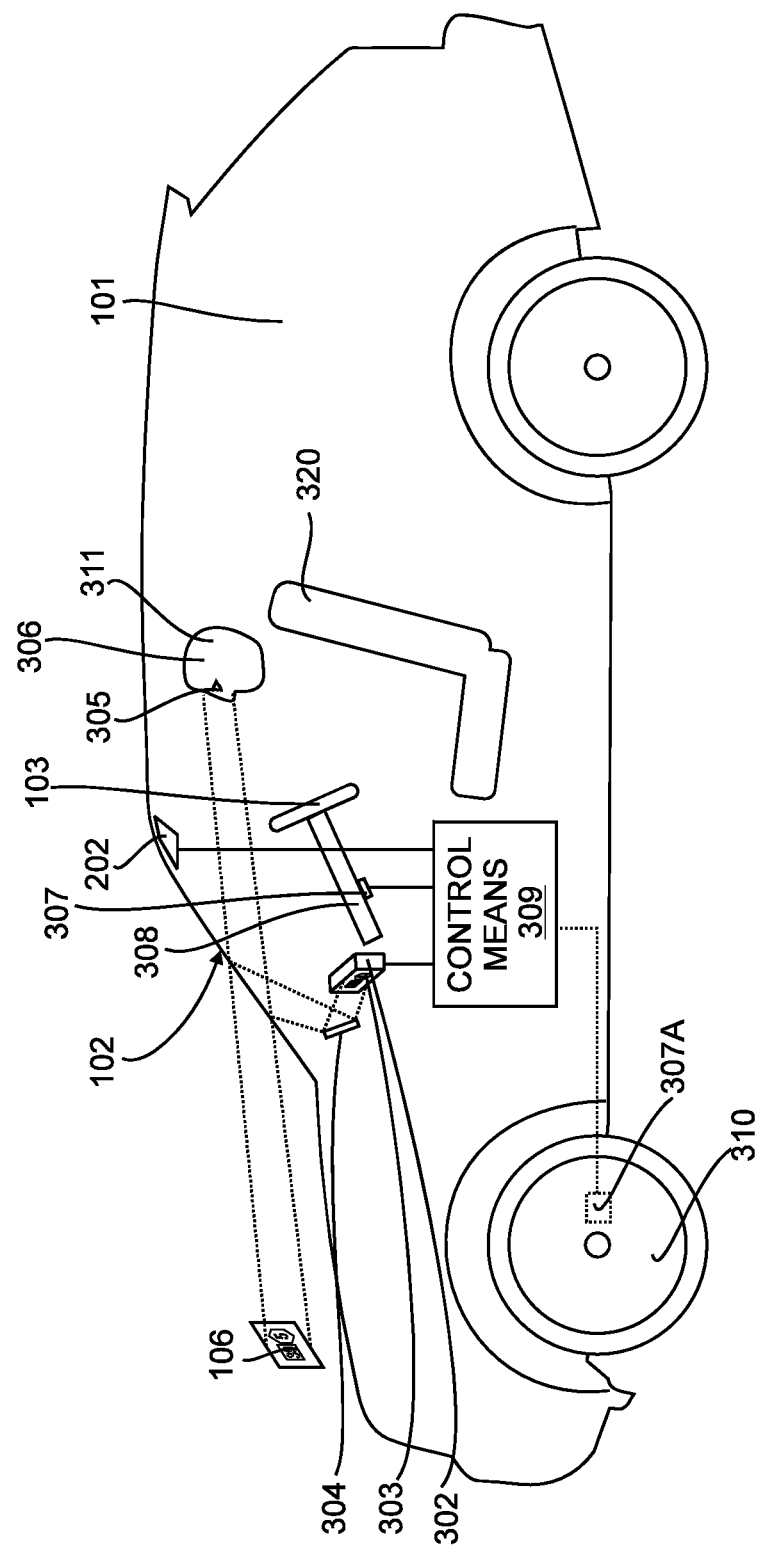
FIG. 3 shows a schematic side view of the vehicle of FIG. 1 including a head-up display system in accordance with an embodiment of the invention.

A schematic side view of the vehicle 101 including an embodiment of a head-up display system 301 is shown in FIG. 3. In the illustrated embodiment, the head-up display system 301 comprises head-up display apparatus 302 comprising one or more display devices 303 and one or more mirrors 304. The mirrors are arranged to reflect images generated by the one or more display devices 303 onto the windshield 102 and towards the eyes 305 of the driver 306, so that the eyes 305 of the driver reside within the eye-box of the head-up display apparatus 302. Consequently, the driver 306 views the graphical element 106 displayed by the head-up display apparatus 302 as a virtual object located on the outside of the windshield 102. In an alternative embodiment, the one or more display devices 303 of the head-up display apparatus 302 are arranged to provide images that are directly reflected in the windshield 102 towards the eyes of the driver, i.e. the one or more mirrors 304 are omitted.

In the illustrated embodiment, the head-up display system 301 comprises a sensing means 307 located on the steering column 308 of the steering wheel 103. The sensing means 307 comprises a sensor configured to provide a signal in dependence on the angle of rotation of the steering wheel 103 from the neutral position. The signal that is output by the sensing means 307 is provided to a control means 309, which is configured to determine the steering angle and angular rate from the signal generated by the sensing means 307. In some alternative embodiments, instead of using a sensing means 307 on the steering column 308, the head-up display system 301 comprises sensing means 307A configured to provide a signal in dependence on the angle of one or more steerable road-wheels 310. However, in each embodiment, the signal provided by the sensing means 307, 307A may be considered to provide a signal indicative of the angle of rotation (and rate of change of that angle) of the steering wheel 103 from its neutral position or an angle of one of the steerable road-wheels 310 relative to a longitudinal axis along the length of the vehicle 101.

In the present embodiment, the head-up display system 301 also includes the imaging means 202 for capturing images of the head 311 and/or at least one eye 305 of the driver 306 of the vehicle 101. The head-up display system 301 also includes processing means for analysing the images captured by the imaging means 202 to determine a head orientation and/or an eye-gaze direction of a driver 306 of the vehicle 101. In the present embodiment, the head orientation that is determined relates to head yaw only, i.e. rotation of the head about a vertical axis. ("Vertical" in this context means a direction parallel to the direction of the height of the vehicle). The processing means for analysing the images may be incorporated within the one or more cameras 202 or may be a function provided by a separate device/component.

The control means 309 is configured to obtain first directional data indicative of the steering angle of the vehicle 101. The first directional data may be provided to the control means 309 by the sensing means 307 or the first direction data may be determined from signals received by the sensing means 307. The control means 309 is also configured to adjust a position of the graphical element 106 presented by the head-up display apparatus 302 in dependence on the first directional data. Thus, as illustrated by FIGS. 1 and 2, the position at which the graphical element 106 is displayed depends upon the angle through which the steering wheel 103 is turned.

In the present embodiment, the control means 309 is also configured to obtain second directional data representative of an orientation of the head 311 of the user 306 and/or an eye-gaze direction of the user 306. As indicated above, this second directional data may be provided to the control means 309 by the one or more cameras 202 or may be determined by the control means 309 from signals received from the one or more cameras 202. The control means 309 is configured to adjust the position of the graphical element 106 in dependence on the second directional data, as well as the first directional data. For example, the control means 309 may be configured to determine a first displacement of the graphical element 106 in dependence on the first directional data and determine a second displacement of the graphical element in dependence on the second graphical data, and determine an average displacement of the graphical element 106 as a weighted mean of the first displacement and the second displacement. The control means 309 is then configured to adjust the position of the graphical element 106 in dependence on the determined average displacement.

It will be understood that the adjustment of the position of the graphical element 106 is a continuous process that repeatedly updates the position of the graphical element in dependence on the most recently obtained first directional data and second directional data. If during any period the second directional data becomes temporarily unavailable, the control means 309 may adjust the position of the graphical element 106 during that period in dependence on the first directional data only.

Image data for causing the display 303 to display the graphical element 106 is transformed in dependence on the average displacement (or the first displacement only if the second positional data is unavailable) determined by the control means 309. As a consequence, the position of the graphical element 106 displayed by the head-up display apparatus 302 is adjusted. The control means 309 may itself be configured to transform the image data or it may provide an output signal indicative of the average displacement (or first displacement) to another processing means that is configured to transform the image data and provide the transformed image data to the one or more display devices 303 of the head-up display apparatus 302.

The one or more display devices 303 may comprise a DLP (digital light processing) display device, a MEMS (microelectromechanical systems) scanning laser, an LED (light emitting diode) display, an OLED (organic light emitting diode) display, or other light emitting display for generating light that may be reflected off the windshield 102 of the vehicle 101 to create a virtual image outside the windshield.

Figure 4:
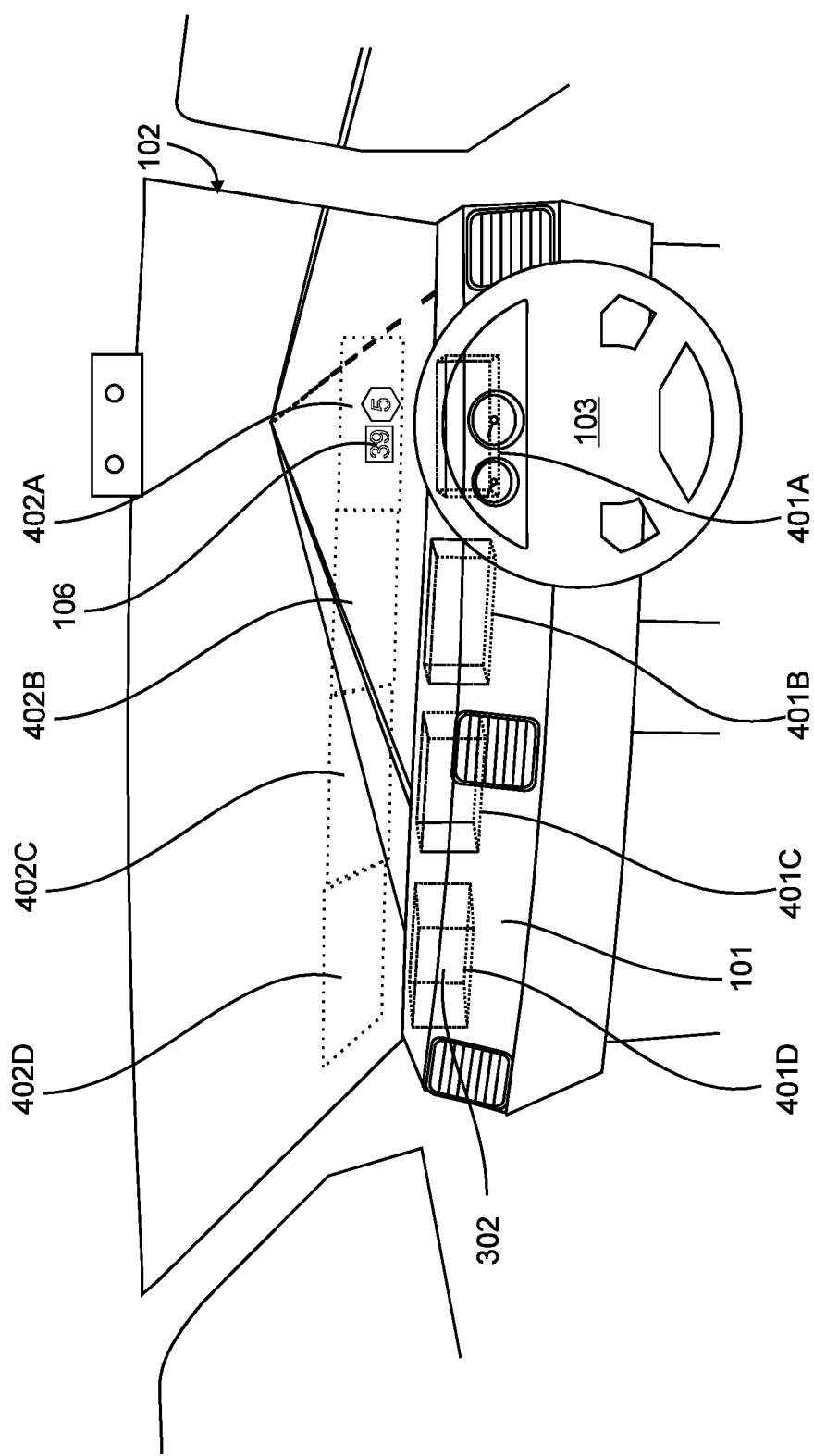
FIG. 4 shows a view from a driver's seat of a vehicle illustrating the operational use of an embodiment of the invention.

The view, previously shown in FIG. 1, from the driver's seat, is shown in FIG. 4, which also illustrates a feature of the head-up display apparatus 302. The head-up display apparatus 302 comprises several, in the illustrated embodiment four, head-up display modules 401A, 401B, 401C and 401D located below the windshield 102. Each of the head-up display modules 401A, 401B, 401C and 401D comprises a display device (303 in FIG. 3) arranged to display an image that is reflected in a respective region 402A, 402B, 402C and 402D of the windshield 102, possibly via one or more mirrors (304 in FIG. 3), towards the position of the eyes of the driver (311 in FIG. 3). With this arrangement, for relatively small adjustments to the position of the graphical element 106, it may be repositioned by one of the modules 401A, 401B, 401C and 401D within the respective region 402A, 402B, 402C and 402D but for larger changes in the position of the graphical element 106, the module that displays the graphical element may be changed. For example, from its position shown in FIG. 4, directly behind the steering wheel 103, as the steering wheel 103 is turned anticlockwise the position of the graphical element 106 may be moved leftwards within the region 402A up to the left edge of the region. When further adjustment leftward is required, the graphical element 106 may begin to be displayed by the second module 401B within its region 402B. The transition from the first region 402A to the second region 402B may be achieved by providing an overlap of the two regions and/or displaying the graphical element 106 partly by the first module 401A and partly by the second module 401B.

Figure 5:
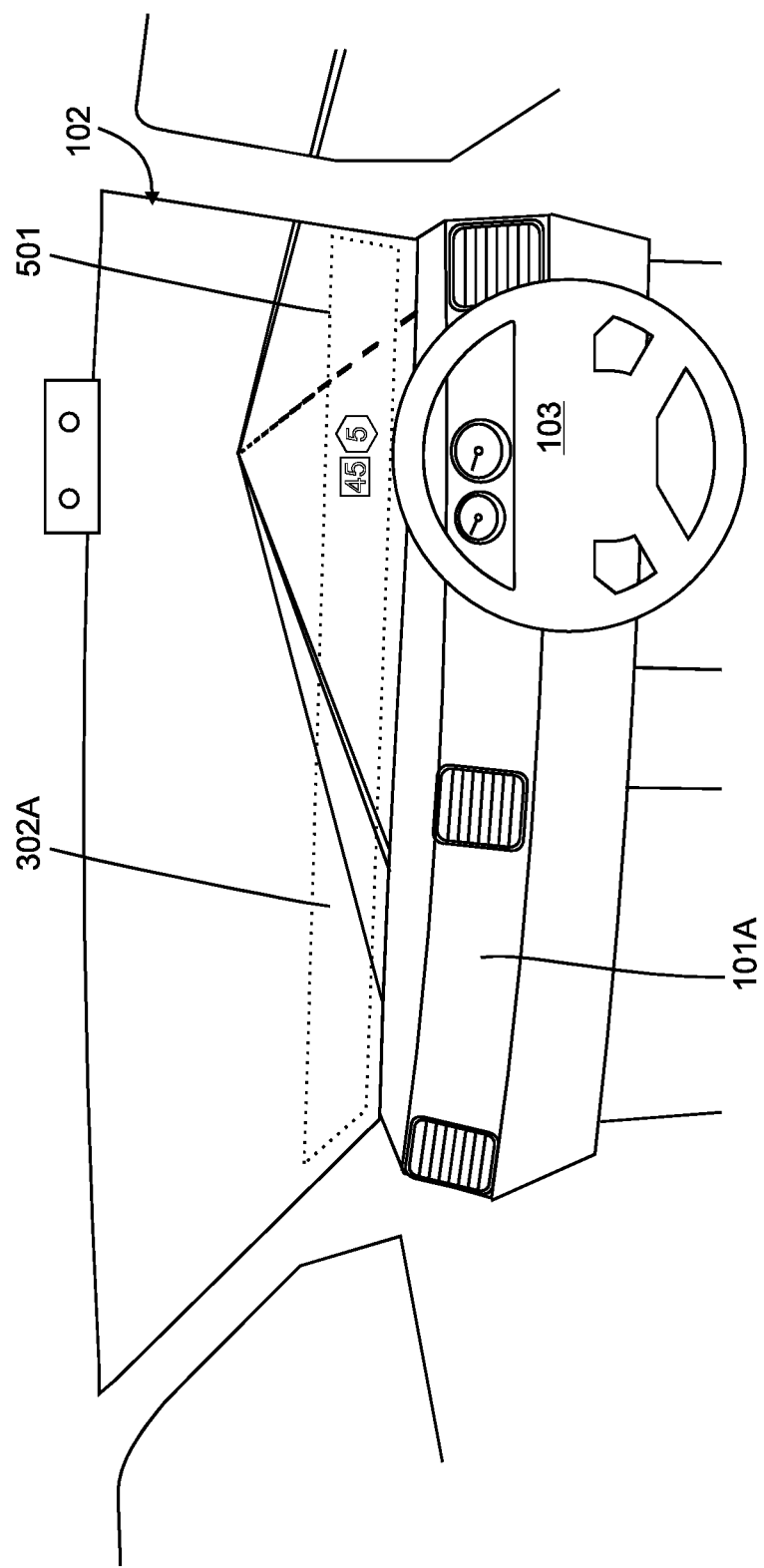
FIG. 5 shows a view from a driver's seat of a vehicle illustrating the operational use of an embodiment of the invention.

A view from the driver's seat of an alternative vehicle 101A is shown in FIG. 5. The vehicle 101A may be identical to the vehicle 101 of FIG. 1 except that it has a head-up display apparatus 302A comprising a transparent display device 501 extending across the windshield. In the illustrated embodiment, the transparent display device 501 comprises a transparent organic light-emitting diode (OLED) display device. The transparent display device 501 may be attached to the windshield 102, or form a part of the windshield 102.

The transparent display device 501 extends across most of the width of the windshield 102 and the graphical element 106 may be displayed to the driver as a real image positioned on or adjacent to the windshield 102, anywhere along the transparent display device 501.

Figure 6:
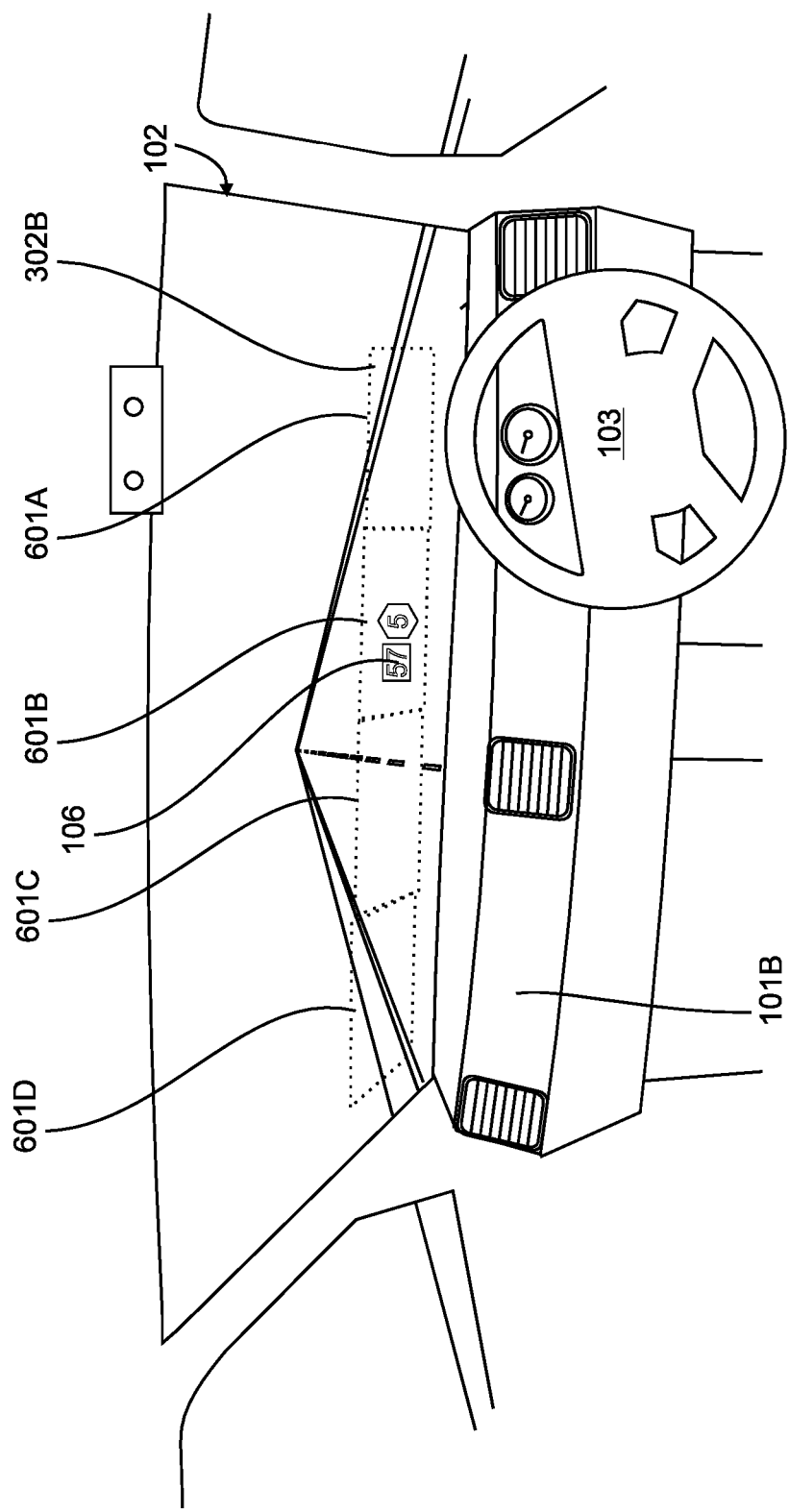
FIG. 6 illustrates an embodiment of a head-up display apparatus in accordance with the invention.

In an alternative arrangement, shown in FIG. 6, a head-up display apparatus 302B of a vehicle 1018 comprises several, in this embodiment four, transparent display devices 601A, 601B, 601C and 601D arranged edge to edge. In the illustrated embodiment, each of the transparent display devices 601A, 601B, 601C and 601D comprises a transparent organic light-emitting diode (OLED) display device. The transparent display devices 601A, 601B, 601C and 601D may be attached to the windshield 102, or form a part of the windshield 102.

With this arrangement, for relatively small adjustments to the position of the graphical element 106, the graphical element 106 may be displayed and repositioned by one of the transparent OLED display devices 601A, 601B, 601C and 601D but for larger changes in the position of the graphical element 106, the transparent OLED display device 601A, 601B, 601C and 601D that displays it may be changed. For example, in FIG. 6, the vehicle 101 is returning to the left side of the road and, because the steering wheel 103 is turned anticlockwise, the position of the graphical element 106 has been moved leftwards from a position within the first transparent OLED display device 601A to a position within the second transparent OLED display device 601B.

In a further alternative embodiment, the head-up display apparatus 302 comprises a holographic head-up display apparatus, and the hologram generated by the apparatus is moved horizontally by changing the diffraction pattern. The hologram may be 2-dimensional or 3-dimensional.

Figure 7:
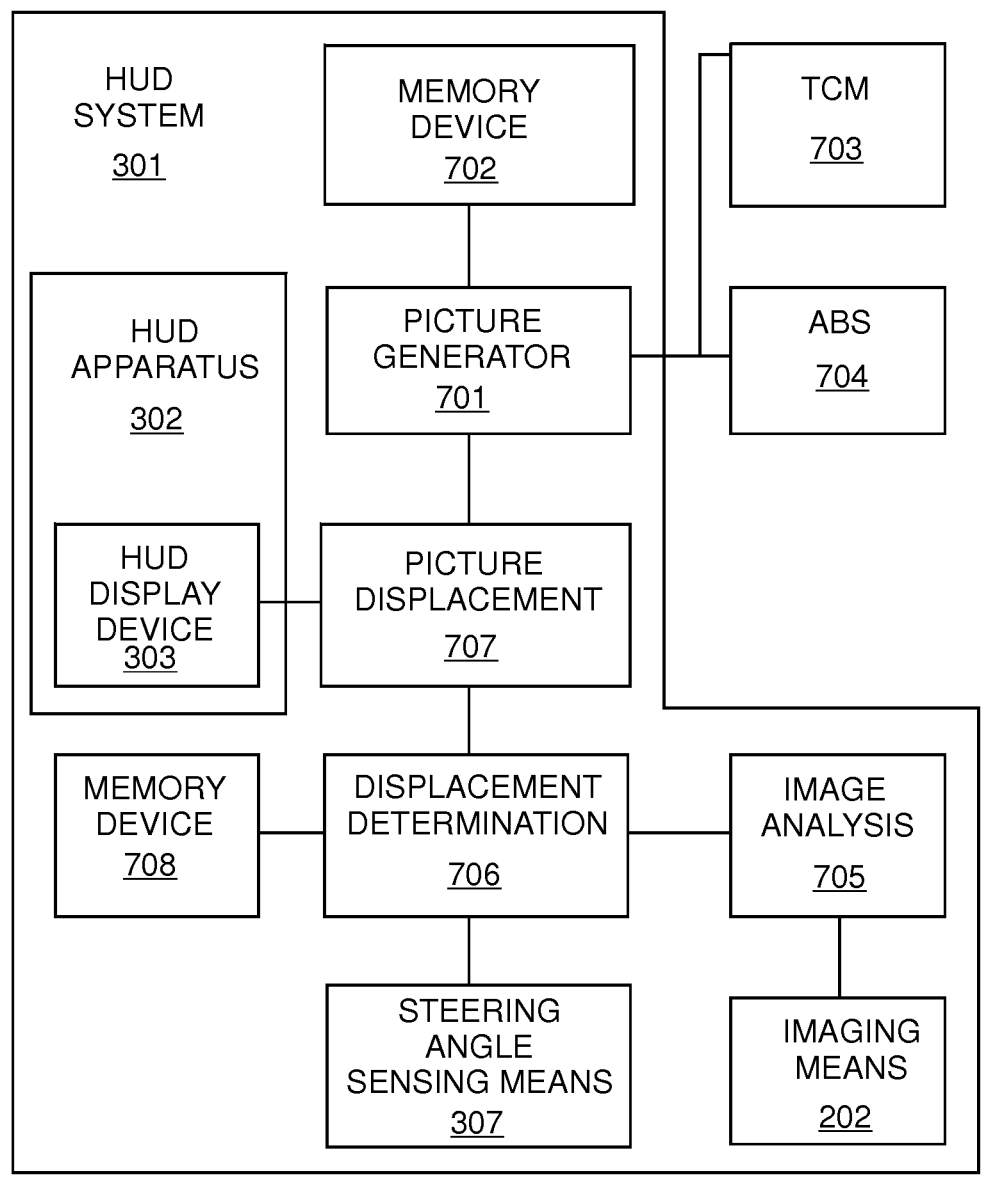
FIG. 7 shows a diagram illustrating functional blocks of an embodiment of a head-up display system in accordance with the invention.

A diagram illustrating functional blocks of an embodiment of the head-up display system 301 is shown in FIG. 7. A picture generator 701 provides image data for display by the head up display apparatus 302. In the illustrated embodiment, the image data generated by the picture generator 701 is generated in dependence on a first signal indicative of the current road speed received from an antilock braking system (ABS) 704 (or alternatively a speedometer) and a second signal indicative of the currently selected gear received from a transmission control module (TCM) 703. The picture generator 701 generates graphical data comprising a graphical element (106 in FIG. 1) that illustrates the current road speed and the currently selected gear in a format determined by graphical data stored in a memory device 702.

An image analysis means 705 receives images captured by the image sensing means 202 and analyses each of the images to generate the second directional data indicative of a head orientation and/or an eye gaze direction of the driver (311 in FIG. 3).

A displacement determination means 706 receives the second directional data from the image analysis means 705 and also receives the first directional data from a steering angle sensing means 307. The displacement determination means 706 determines a first displacement from the first directional data, for example the first displacement may be calculated using a predefined function that comprises the steering angle as a variable. The function is typically non-linear, being such that the first displacement is proportional to the steering angle up to a threshold value of the steering angle and the first displacement is constant for steering angles greater than the threshold value.

The displacement determination means 706 also determines the second displacement in dependence on the second directional data received from the image analysis means 705. The second displacement may be determined from second positional data relating to the eye-gaze direction when such data is available, without making use of second directional data relating to the head orientation. Otherwise, when second positional data relating to the eye-gaze direction is unavailable, the second displacement may be determined from second positional data relating to the head orientation.

The second displacement may be calculated using a predefined function that comprises the head orientation as a variable or calculated using a predefined function that comprises the eye-gaze direction as a variable. Alternatively, second displacement values corresponding to the head orientation or the eye-gaze direction may be retrieved from a memory device 708. In an embodiment, the memory device 708 stores look-up-tables in which head orientation angles or eye-gaze directions are stored along with corresponding second displacement values. The look-up tables may be populated during a calibration process in which a head orientation angle and an eye-gaze direction are detected for each one of a series of different displacements of a graphical element 106 which a person in the driver's seat is viewing.

The displacement determination means 706 is arranged to repeatedly determine first displacements and second displacements in respect of the most recently received first directional data and second directional data. It is also configured to repeatedly determine average displacements from the most recently determined first and second displacements, as described above, and provide displacement data indicative of average displacements to a picture displacement means 707. However, if second positional data becomes temporarily unavailable, displacement data indicative of the most recently determined first displacements are provided to the picture displacement means 707, instead.

The picture displacement means 707 transforms the graphical image data received from the picture generator 701 in dependence on the displacement data received from the displacement determination means 706 in order to generate transformed graphical image data for supply to the head-up display apparatus 302, so that the graphical element 106 displayed by the head-up display apparatus 302 is displaced by the average displacement or the first displacement.

As mentioned above, the control means 309 (shown in FIG. 3) is configured to perform the function of the displacement determination means 706 in dependence on first directional data and, in embodiments where it is available, in dependence on the second directional data. The control means 309 may also be configured to perform the function of the image analysis means 705 but alternatively it may obtain the second directional data from another processing means such as one located in a camera 202.

The control means 309 may also be configured to perform the function of the picture displacement means 707 and/or the picture generator 701. Alternatively, other processing means may be utilised. In which case, the control means 309 provides an output comprising the displacement data generated by the displacement determination means 706.

Figure 8:
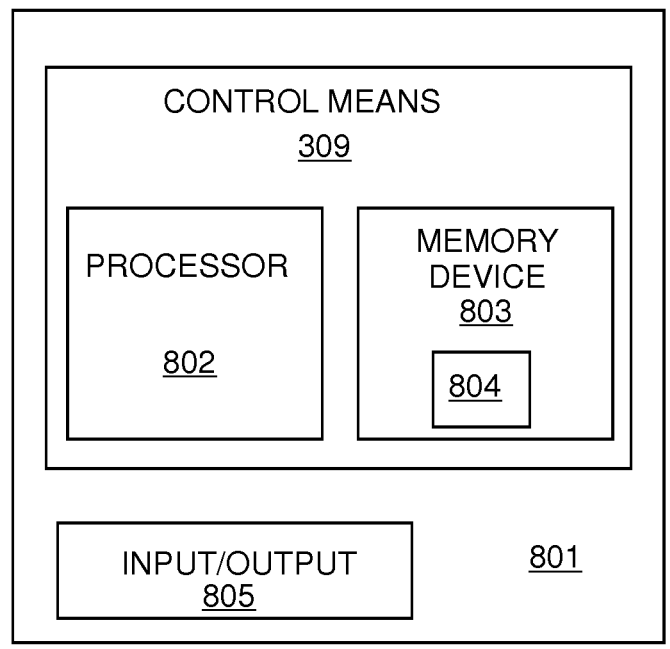
FIG. 8 shows a schematic diagram of an embodiment of a control apparatus comprising a control means in accordance with the invention.
Figure 8:
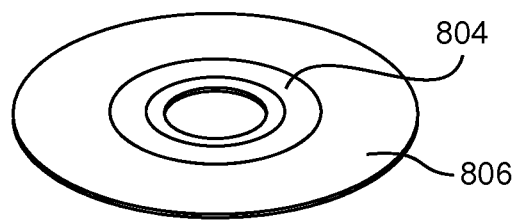

A control apparatus 801 comprising the control means 309 is shown in the schematic diagram of FIG. 8. The control means 309 comprises one or more electronic processors 802 and an electronic memory device 803. A computer program 804 comprising instructions is stored in the memory device 803 and the one or more electronic processors 802 are configured to execute the instructions and perform at least the function of the displacement determination means (706 shown in FIG. 7) as described above and/or any one of the methods described below with reference to FIGS. 9 to 13.

In embodiments in which the control means 309 comprises several processors, the processors may be located with a single module or may be distributed over several different modules. For example, the function of the image analysis means (705 of FIG. 7) may be performed by a processor 802 of the control means 309 that is located within a camera 202 configured to capture images of the head of the user, while the function of the displacement determination means (706 of FIG. 7) may be performed by a processor 802 located within the head-up display apparatus 302.

The apparatus 801 also comprises input/output means 805 for receiving and transmitting communications to other electronic devices. The input/output means 805 may comprise one or more transceivers for communicating with other devices over data buses, such as a controller area network bus (CAN bus) of the vehicle 101.

The computer program 804 may be transferred to the memory device 803 via a non-transitory computer readable medium, such as a CD-ROM 806 or a portable memory device, or via a network, such as a wireless network.

Figure 9:
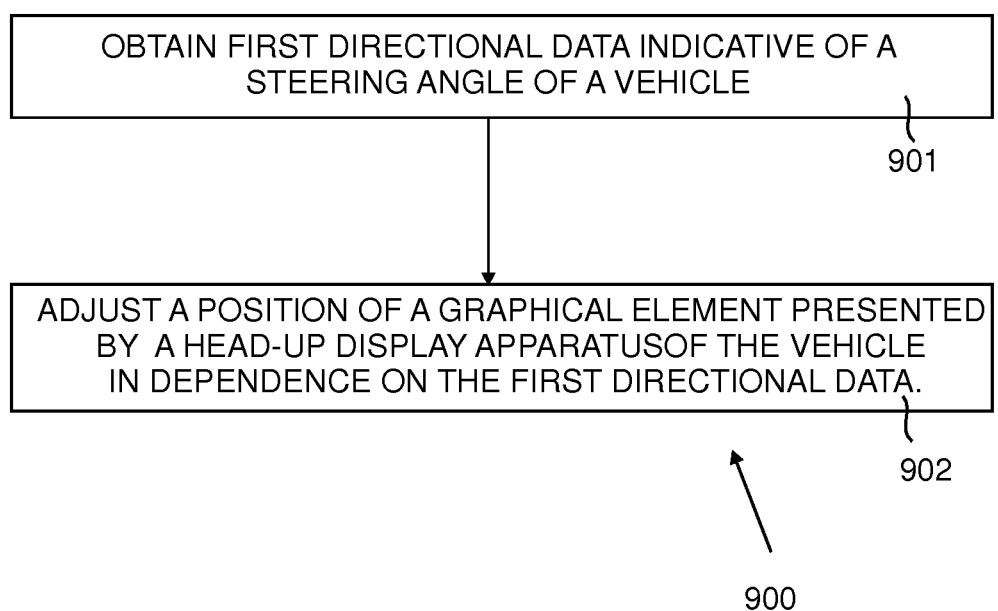
FIG. 9 shows a flowchart illustrating a method according to an embodiment of the invention.

A flowchart illustrating a method 900 of controlling the operation of a head-up display apparatus, performable by the apparatus 801, is shown in FIG. 9. At block 901 of the method 900, first directional data indicative of a steering angle of a vehicle 101 is obtained. The first directional data may be received from a sensing means 307, 307A or may be derived from a signal received from a sensing means 307, 307A. At block 902, the method adjusts a position of a graphical element 106 presented by a head-up display apparatus 302 of the vehicle 101 in dependence on the first directional data. As described with reference to FIG. 7, this may comprise providing displacement data which may then be used to transform image data for supply to the head-up display, or may additionally comprise transforming image data in dependence on the displacement data.

In a typical method, the method 900 is repeatedly performed so that the position of the graphical element is repeatedly adjusted in dependence on the most recently received first directional data. Typically the rate at which the method 900 is repeated is sufficiently high to provide the graphical element 106 with the appearance of continuous movement while the steering angle is adjusted.

Figure 10:
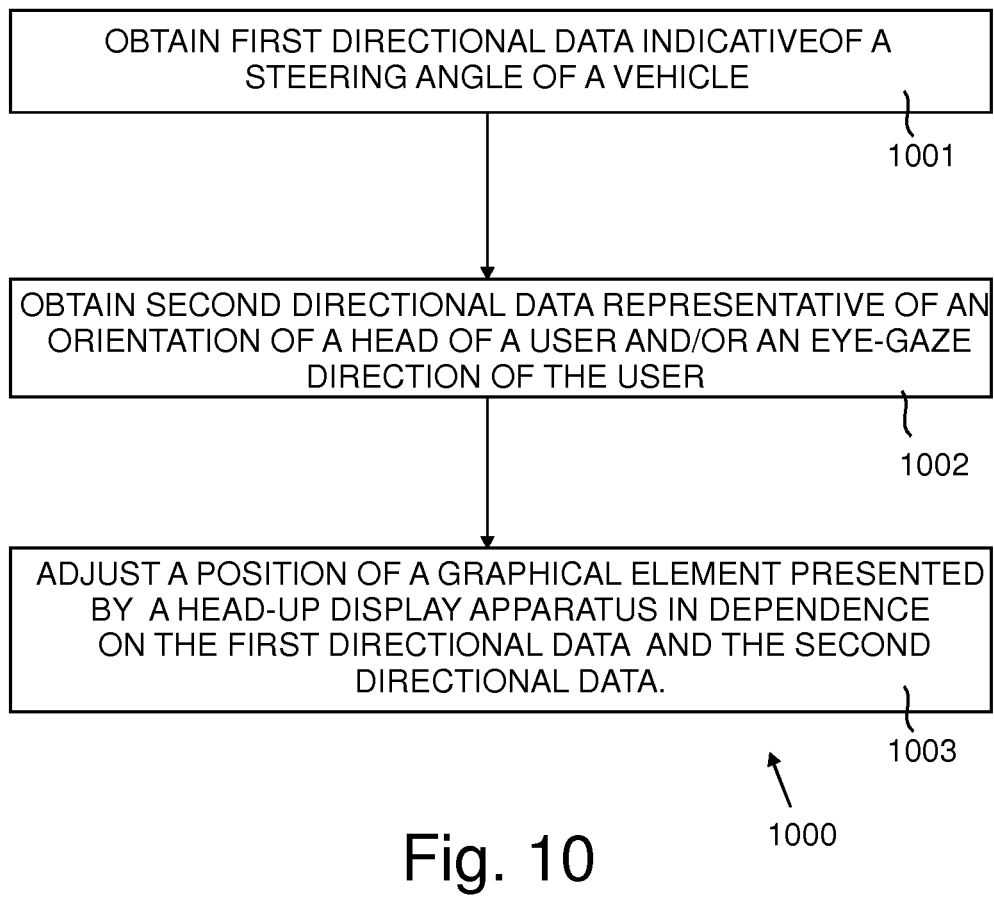
FIG. 10 shows a flowchart illustrating a method according to an embodiment of the invention.

A flowchart illustrating another method 1000 of controlling the operation of a head-up display apparatus 302, performable by the apparatus 801, is shown in FIG. 10. At block 1001 of the method 1000, first directional data indicative of a steering angle of a vehicle is obtained. Thus, the process at block 1001 of the method 1000 is the same as the process at block 901 of method 900.

Figure 11:
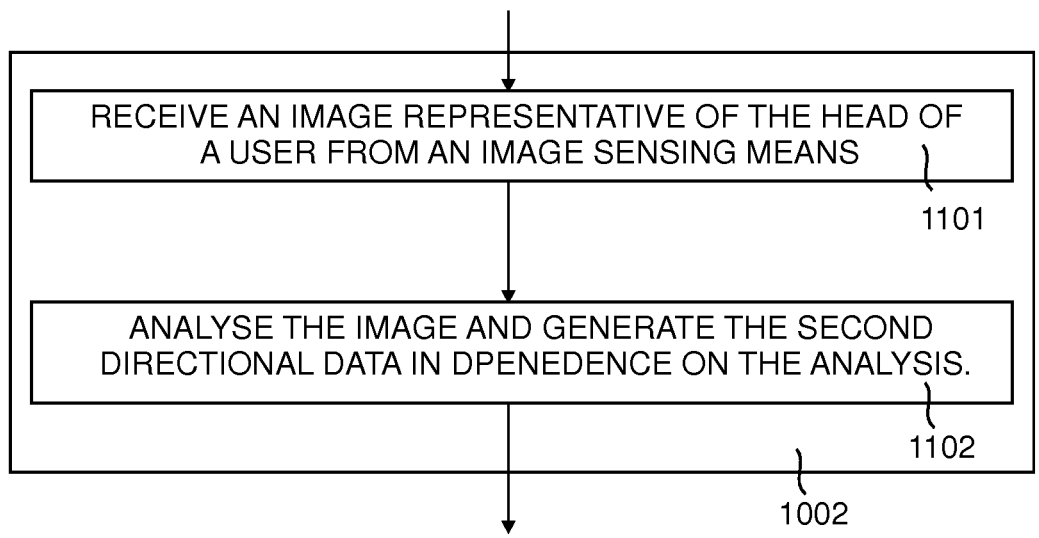
FIG. 11 shows a flowchart illustrating a method according to an embodiment of the invention.

At block 1002, second directional data representative of an orientation of a head of a user and/or an eye-gaze direction of the user of the vehicle are obtained. The second directional data may be received from a process configured to analyse image data representing one or more captured images of the user. Alternatively, as illustrated in the flowchart of FIG. 11, the process at block 1002 may comprise, at a block 1101 receiving an image representative of the head of the user from an image sensing means, such as one or more cameras, and, at a block 1102, analysing the image and generating the second direction data in dependence on the analysis.

Returning to FIG. 10, at block 1003 the method 1000 adjusts a position of a graphical element presented by the head-up display apparatus in dependence on the first directional data and the second directional data. As described above, this may be achieved by determining a first displacement in dependence on the first directional data and a second displacement in dependence on the second directional data, and determining an average displacement as the mean or the weighted mean of the first and second displacements. Thus, a position to which the graphical element is adjusted depends on both first directional data and second directional data.

In a typical method, the method 1000 is repeatedly performed so that the position of the graphical element is repeatedly adjusted in dependence on the most recently obtained first directional data and most recently obtained second directional data.

Figure 12:
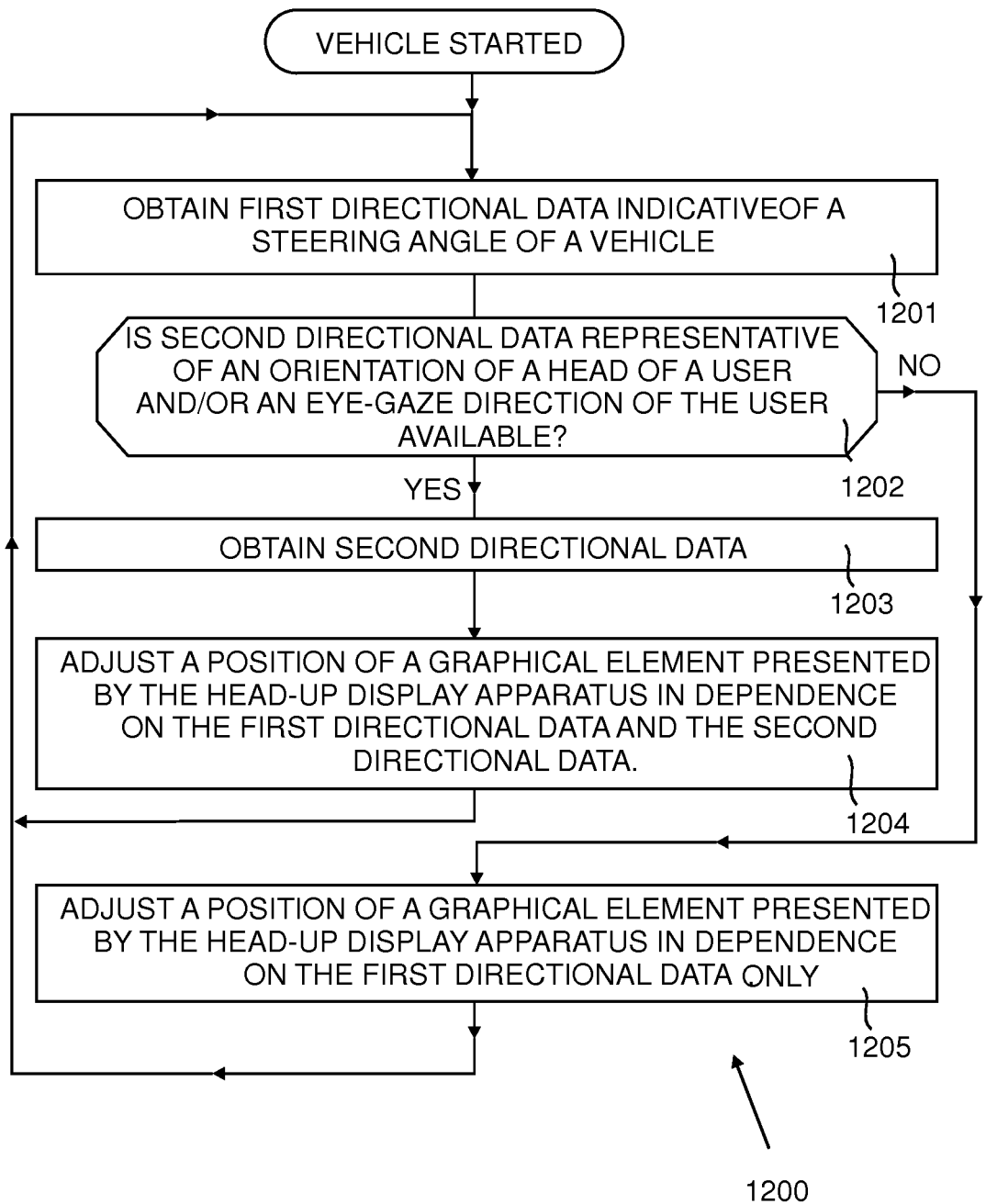
FIG. 12 shows a flowchart illustrating a method according to an embodiment of the invention.

A flowchart illustrating another method 1200 of controlling the operation of a head-up display apparatus, performable by the apparatus 801, is shown in FIG. 12. The process at block 1201 of the method 1200 is first performed after the vehicle 101 is started, i.e. when the vehicle 101 is switched on, into a state in which it is ready to be driven. At block 1201 of the method 1200, first directional data indicative of a steering angle of a vehicle 101 is obtained. Thus, the process at block 1201 of the method 1200 is the same as the process at block 901 of method 900.

At block 1202 it is determined whether second directional data representative of an orientation of the head of a user and/or an eye-gaze direction of the user is available. If it is not then at block 1205 the method 1200 adjusts a position of a graphical element presented by a head-up display apparatus in dependence on the first directional data only. The processes at blocks 1201 and 1202 are then repeated.

Alternatively, if it is determined at block 1202 that second directional data is available, the process at block 1203 is performed in which the most recently generated second directional data is obtained, and at block 1204 the position of the graphical element presented by the head-up display apparatus is adjusted in dependence on the first directional data and the second directional data. The process at block 1204 may therefore be the same as the process at block 1003 of FIG. 10. Following the process at block 1204, blocks 1201 and 1202 are repeated. Thus, the method 1200 repeatedly loops around the processes at block 1201, 1202, 1203 and 1204 if second directional data is available, and if it becomes temporarily unavailable the method 1200 repeatedly loops around the processes of blocks 1201, 1202 and 1205 until the second positional data becomes available again.

Figure 13:
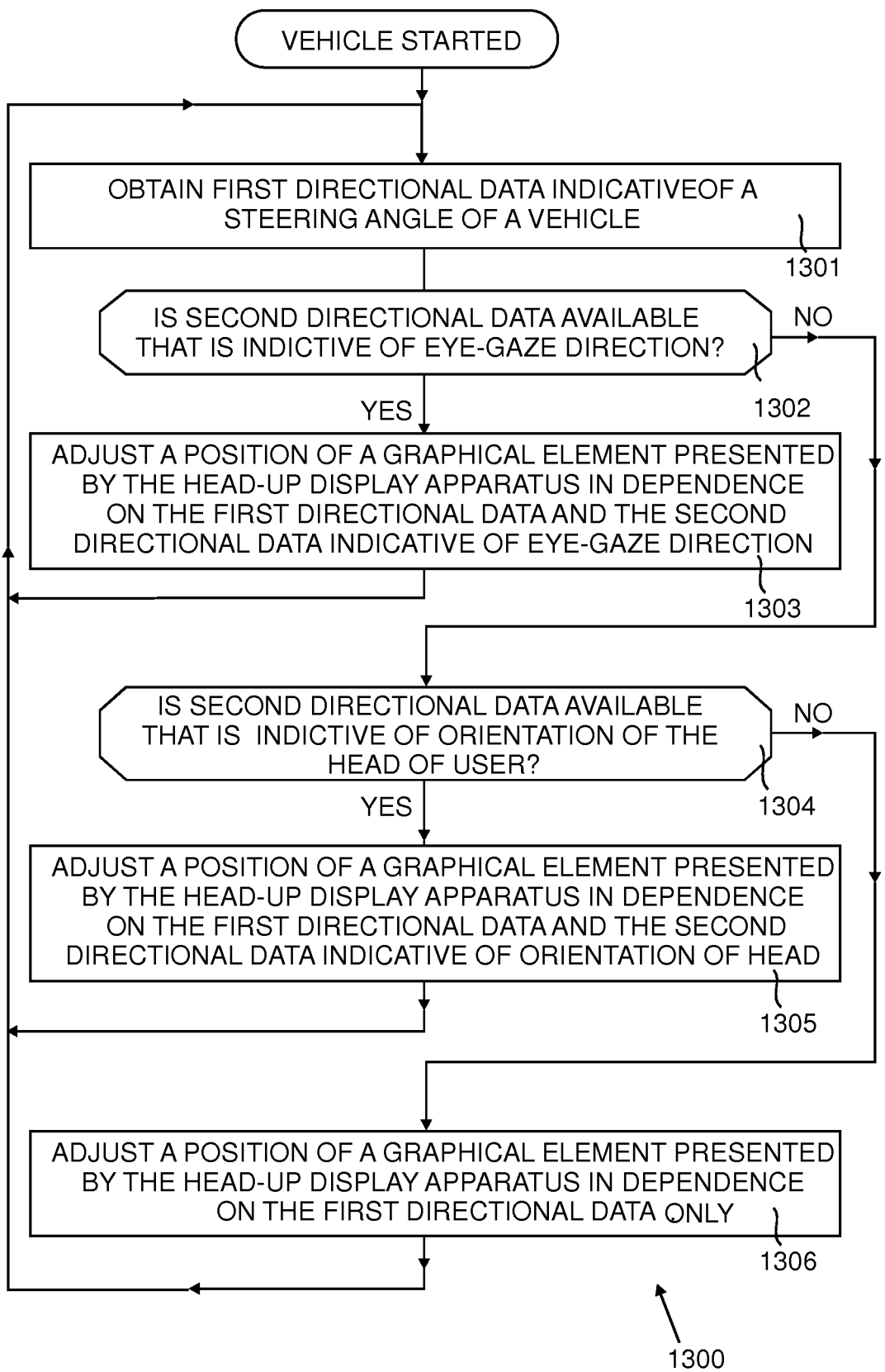
FIG. 13 shows a flowchart illustrating a method according to an embodiment of the invention.

A flowchart illustrating a method 1300 of controlling the operation of a head-up display apparatus, performable by the apparatus 801, is shown in FIG. 13.

The process at block 1301 of the method 1300 is first performed after the vehicle 101 is started, i.e. when the vehicle 101 is switched on, into a state in which it is ready to be driven. At block 1301 of the method 1300, first directional data indicative of a steering angle of a vehicle 101 is obtained. Thus, the process at block 1301 of the method 1300 is the same as the process at block 901 of method 900.

At block 1302 it is determined whether second directional data indicative of eye-gaze direction is available and, if it is, then the method 1300 adjusts a position of a graphical element presented by a head-up display apparatus in dependence on the first directional data and the second directional data indicative of eye-gaze direction, at block 1303. The method 1300 then repeats the processes at blocks 1301, 1302 and 1303 until it is determined at block 1302 that second directional data indicative of eye-gaze direction is unavailable.

If it is determined at block 1302 that second directional data indicative of eye-gaze direction is unavailable, then the method performs the process at block 1304 in which it is determined whether second directional data indicative of orientation of the head of the user is available. If it is, then the method 1300 adjusts a position of a graphical element presented by a head-up display apparatus in dependence on the first directional data and the second directional data indicative of head orientation, at block 1305. The method 1300 then repeats the processes at blocks 1301, 1302, 1304 and 1305 until either it is determined at block 1302 that second directional data indicative of eye-gaze direction is available or it is determined at block 1304 that second directional data indicative of head orientation is unavailable.

If it is determined at block 1304 that second directional data indicative of head orientation is unavailable, the process at block 1306 is performed in which the position of the graphical element presented by the head-up display apparatus is adjusted in dependence on the first directional data only. The processes at blocks 1301, 1302, 1304 and 1306 are then repeated until either it is determined that second directional data is available indicative of eye-gaze direction at block 1302 or head orientation at block 1304.

Thus, in the method 1300, the position of the graphical element is adjusted in dependence on the first directional data indicative of steering angle of the vehicle and second directional data indicative of eye-gaze direction, if it is available, or second directional data indicative of head orientation if it is not, and if no second directional data is available the graphical element is adjusted in dependence on the first directional data only.

For purposes of this disclosure, it is to be understood that the control means or controller(s) described herein can each comprise a control unit or computational device having one or more electronic processors. A vehicle and/or a system thereof may comprise a single control unit or electronic controller or alternatively different functions of the control means or controller(s) may be embodied in, or hosted in, different control units or controllers. A set of instructions could be provided which, when executed, cause said controller(s) or control unit(s) to implement the control techniques described herein (including the described method(s)). The set of instructions may be embedded in one or more electronic processors, or alternatively, the set of instructions could be provided as software to be executed by one or more electronic processor(s). For example, a first controller may be implemented in software run on one or more electronic processors, and one or more other controllers may also be implemented in software run on or more electronic processors, optionally the same one or more processors as the first controller. It will be appreciated, however, that other arrangements are also useful, and therefore, the present disclosure is not intended to be limited to any particular arrangement. In any event, the set of instructions described above may be embedded in a computer-readable storage medium (e.g., a non-transitory storage medium) that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable programmable memory (e.g., EPROM ad EEPROM); flash memory; or electrical or other types of medium for storing such information/instructions.

The blocks illustrated in the FIGS. 9 to 13 may represent steps in a method and/or sections of code in the computer program 804. The illustration of a particular order to the blocks does not necessarily imply that there is a required or preferred order for the blocks and the order and arrangement of the block may be varied. Furthermore, it may be possible for some steps to be omitted.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A method of controlling the operation of a head-up display apparatus, the method comprising:
   obtaining first directional data indicative of a path of a vehicle, wherein the first directional data comprises steering angle data indicative of a steering direction of the vehicle, wherein the steering angle data is from a sensing device configured to detect a rotational angle of a steering wheel or steerable element of the vehicle;
   presenting a graphical element formed from generated image data;
   obtaining second directional data representative of a lateral orientation of a head of a user and/or a lateral eye-gaze direction of the user;
   adjusting a position of the graphical element in dependence on the first directional data and the lateral orientation of the head of the user and/or the lateral eye-gaze direction of the user;
   wherein the adjusting comprises displacement of the graphical element in the steering direction along a lateral axis of the vehicle, wherein the displacement is in proportion to the steering angle;
   selecting a dynamic displacement mode in which the position of the graphical element is adjusted in dependence on the first directional data when a rate of change of steering angle is below a threshold value; and
   selecting a static displacement mode in which the position of the graphical element is fixed when a rate of change of steering angle is above a threshold.

2. The method according to claim 1, wherein the method comprises presenting the graphical element to a user of the vehicle as an image on a windshield of the vehicle, as an image on a transparent or translucent member positioned between a user of the vehicle and the windshield, or as a virtual object on the outside of the windshield.

3. The method according to claim 1, further comprising:
   receiving an image representative of the head of the user from a camera; and
   analysing the image to generate the second directional data in dependence on the image.

4. The method according to claim 1, wherein the adjusting comprises adjusting the position of the graphical element in dependence on the first directional data only, in dependence on the second directional data being temporarily unavailable.

5. The method according to claim 1, wherein the adjusting comprises adjusting the position of the graphical element in a direction along the lateral axis of the vehicle in dependence on the second directional data.

6. The method according to claim 1, wherein the first directional data comprises a rate of change of steering angle and adjusting the position of the graphical element in dependence on said rate of change of steering angle.

7. The method according to claim 1, further comprising: increasing a displacement of the graphical element in proportion to the steering angle in dependence on the steering angle being less than a threshold value; and maintaining the graphical element at an end position in dependence on the steering angle being equal to or greater than the threshold value.

8. A non-transitory computer-readable medium storing a computer program which when executed by a processor causes the processor to perform the method of claim 1.

9. A control apparatus for controlling the operation of a head-up display apparatus, the control apparatus configured to:
- obtain first directional data indicative of a path of a vehicle, wherein the first directional data comprises steering angle data indicative of a steering direction of the vehicle, wherein the steering angle data is from a sensing device configured to detect a rotational angle of a steering wheel or a steerable element of the vehicle;
- obtain second directional data representative of a lateral orientation of a head of a user and/or a lateral eye-gaze direction of the user;
- wherein the control apparatus is configured to adjust a position of a graphical element in dependence on both the first directional data and the lateral orientation of the head of the user and/or the lateral eye-gaze direction of the user;
- wherein the adjust comprises displacement of the graphical element in the steering direction along a lateral axis of the vehicle, wherein the displacement is in proportion to the steering angle;
- select a dynamic displacement mode in which the position of the graphical element is adjusted in dependence on the first directional data when a rate of change of steering angle is below a threshold value; and
- select a static displacement mode in which the position of the graphical element is fixed when a rate of change of steering angle is above a threshold.

10. The control apparatus according to claim 9, wherein the control apparatus is located within a vehicle comprising a windshield and a head-up display apparatus arranged to present the graphical element to a driver of the vehicle as an image on the windshield, as an image on a transparent or translucent member positioned between a user of the vehicle and the windshield, or a virtual object on the outside of the windshield.

11. The control apparatus according to claim 9, further comprising: input arranged to receive an image representative of the head of the user from a camera; and
- a processor configured to analyse the image and generate the second directional data in dependence thereon.

12. The control apparatus according to claim 9, wherein the control apparatus is configured to adjust the position of the graphical element in dependence on the first directional data only, in dependence on the second directional data being temporarily unavailable.

13. The control apparatus according to claim 11, wherein the control apparatus is configured to adjust the position of the graphical element in a direction along the lateral axis of the vehicle in dependence on the second directional data.

14. The control apparatus according to claim 9, wherein the control apparatus is further configured to:
- increase a displacement of the graphical element in proportion to the steering angle in dependence on the steering angle being less than a threshold value; and
- maintain the graphical element at an end position in dependence on the steering angle being equal to or greater than the threshold value.

15. The control apparatus according to claim 9, wherein the control apparatus is further configured to increase a displacement of the graphical element in proportion to the rate of change of steering angle.

16. The control apparatus according to claim 9, wherein the control apparatus is further configured to: increase a displacement of the graphical element in proportion to the steering angle in dependence on the rate of change of steering angle being less than a threshold value; and
- maintain the graphical element at an end position in dependence on the rate of change of steering angle being equal to or greater than the threshold value.

17. The control apparatus of claim 9 comprised in a vehicle.

* * * * *